C. E. WEAVER.
TORQUE TUBE.
APPLICATION FILED JUNE 16, 1921.
1,435,355.
Patented Nov. 14, 1922.
2 SHEETS—SHEET 1.
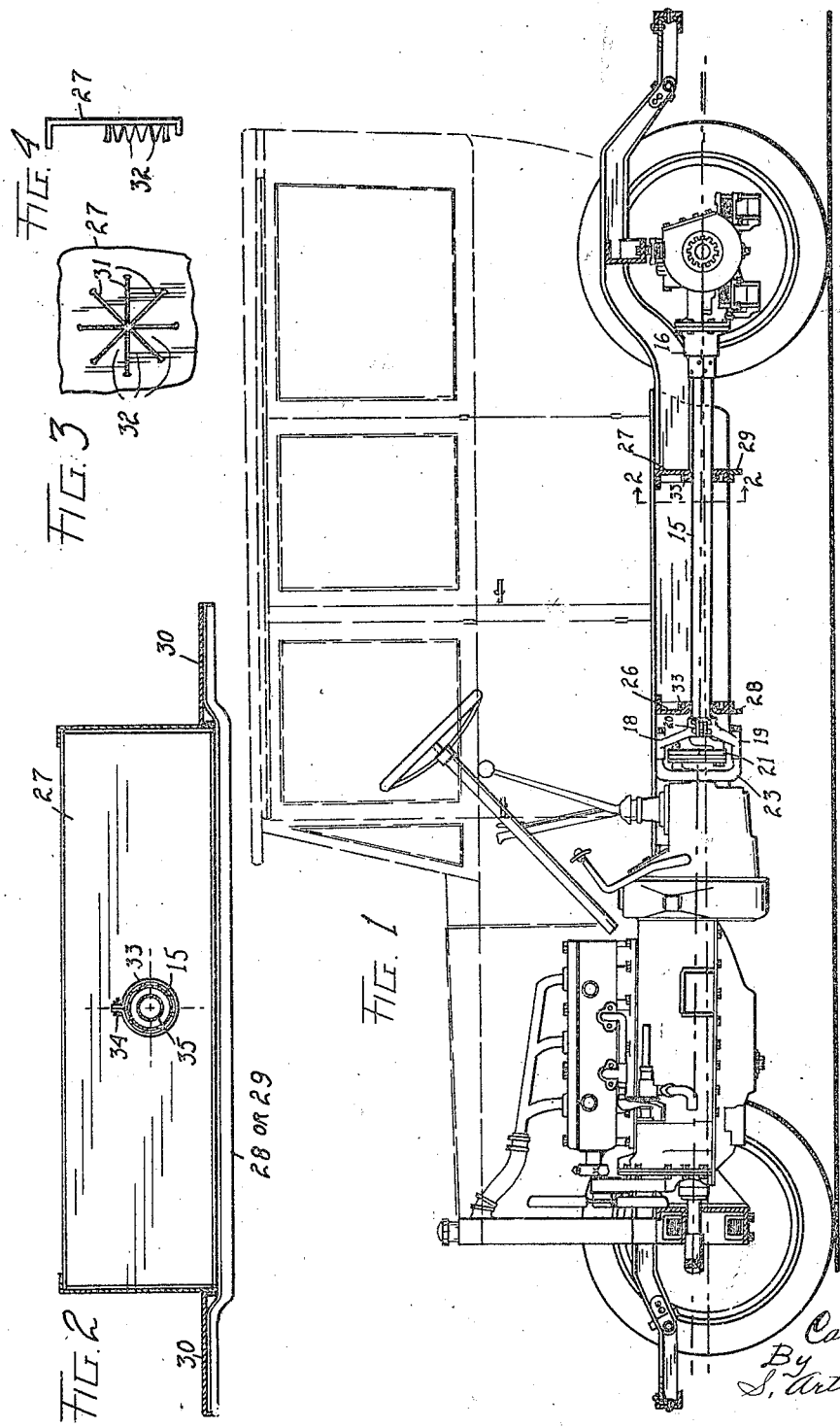

C. E. WEAVER.
TORQUE TUBE.
APPLICATION FILED JUNE 16, 1921.
1,435,355.
Patented Nov. 14, 1922.
2 SHEETS—SHEET 2.
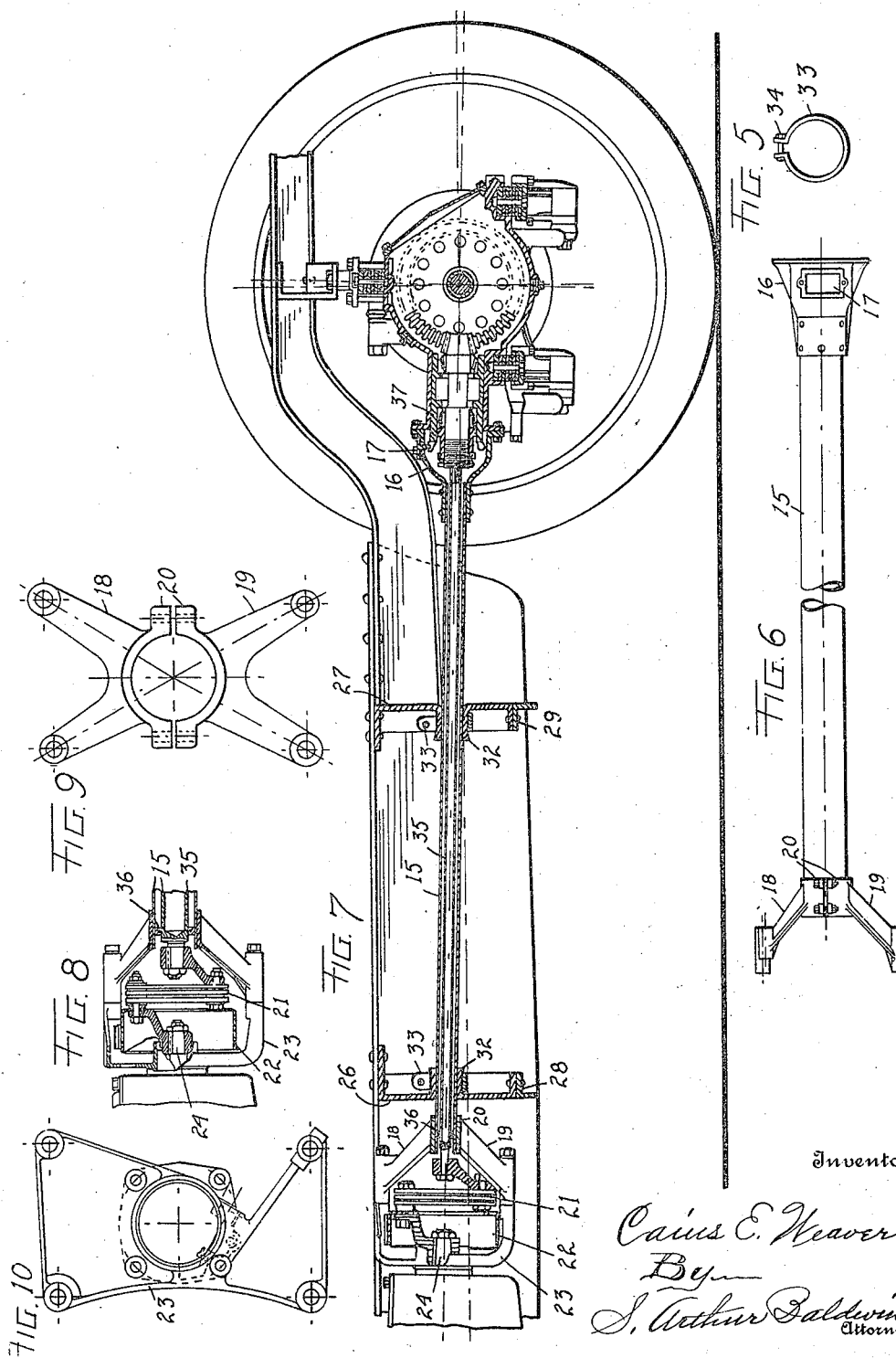

Patented Nov. 14, 1922.

1,435,355

UNITED STATES PATENT OFFICE.

CAIUS E. WEAVER, OF SYRACUSE, NEW YORK, ASSIGNOR TO BIRMINGHAM MOTORS, A TRUST, OF JAMESTOWN, NEW YORK.

TORQUE TUBE.

Application filed June 16, 1921. Serial No. 477,997.

*To all whom it may concern:*

Be it known that I, CAIUS E. WEAVER, a citizen of the United States, residing at the city of Syracuse, in the county of Onondaga and State of New York, have invented certain new and useful Improvements in Torque Tubes, of which the following, taken in connection with the accompanying drawings, is a specification.
The invention relates to the construction and assemblage of torque tubes into automobile frames; and the improvement consists in providing a torque tube for housing the line or drive shaft from the differential casing to the enclosure bracket for a flexible coupling and brake drum attached to the rear of the transmission casing, and providing clamping means on the supporting cross members so that said torque tube becomes a part of said automobile frame, giving added rigidity and strength thereto and to the drive line extending therethrough, making said tube and contained drive line a part of the chassis assemblage; and the invention consists in the novel features and combinations hereinafter set forth and claimed.

In the drawings, Figure 1 is a lengthwise sectional view of the chassis showing the torque tube built into the same, the automobile body being shown in dotted outline upon said chassis. Fig. 2 is a crosswise sectional view of the automobile frame at line 2—2 in Fig. 1 showing one of the clamped supporting joints for the torque tube in a crosswise member of the frame, and the drive line supported concentrically therein. Fig. 3 is an elevation of a portion of said cross member showing the equal length radial cuts in the same preparatory to turning the points circumferally in line with said tube; and Fig. 4 shows an endwise view of said cross-member with the pointed triangular-shaped clamping members turned at right angles to said cross member for clamping onto the torque tube; and Fig. 5 is a plan view of the clamping ring for clamping said triangular-shaped members onto the torque tube. Fig. 6 is an elevation of said torque tube removed from the automobile frame, the central portion being broken away and showing the attaching brackets at each end. Fig. 7 is a lengthwise sectional view of the torque tube assembled in the chassis, showing the connection at each end thereof, also to the cross-wise members of the automobile frame; and Fig. 8 is a sectional view of the end bracket of the torque tube, and the drive line attachment to the flexible joint connection to the transmission and showing the brake drum therein. Fig. 9 is a plan view of the two parts of the four-way forked or spider-shaped bracket as clamped on the front end of the torque tube; and Fig. 10 is a similar plan view of the opposite or transmission attaching portion of the enclosure bracket to which said bracket spider is attached.

Like characters of reference refer to corresponding parts in the several views.

The torque tube is designated by the numeral 15, and has the attaching bracket 16 attached to its rear end, said bracket 16 having the capped adjustment opening 17 which admits to the adjusting rings on the pinion shaft bearing cage to adjust the same.

The numeral 18 designates the upper portion, and the numeral 19 the lower portion of the two-part spider-shaped four-way bracket, which parts 18 and 19 are clamped on the forward end of the torque tube 15 by means of suitable bolts through the flanges 20 at each side. In order to provide a strong bracing bracketed enclosure for the flexible joint 21 and the brake drum 22, a bracket plate 23 is attached to the rear end of the transmission casing 25, which plate 23 has the projecting portions shaped to fit upon the projecting parts of the spider-shaped bracket parts 18 19 to bolt to one another, provision being made therein for the attachment of the flexible joint 21 to the transmission shaft 24.

The torque tube 15 is made a rigid bracing and supporting portion of the automobile frame by means of the two crosswise members 26 and 27 in said frame, which crosswise members are preferably made in the shallow channel shape, that is, with upper and lower lengthwise flanges. The lower flanges have the angle bar supports 28 and 29 attached thereto which extend out beneath the running boards 30 at each side to give added rigidity to said running boards, assisting in making them also a part of the chassis.

Said crosswise members 28 and 29 are rigidly clamped to the torque tube 15 in the following manner: Spaced equal length radial cuts 31 are made in each of said crosswise members from the axis of the torque tube as it extends at a slightly upward angle of incline from the horizontal, thereby providing toothed or triangular-shaped portions 32 which are turned at right angles to each of said crosswise members 28 and 29, to be used as spaced clamping members 32 for the torque tube 15, which are integral with said crosswise members 28 and 29.

In order to firmly clamp said members 32 firmly upon the torque tube 15, a split clamping ring 33 is provided having the outwardly extending lugs with the bolt 34 therethrough. The outer points of the toothed clamping members 32 are turned sufficiently to hold said clamping ring 33 firmly in position so that it will not easily slip off said members 32 when released, or until it is desired to remove said clamping ring 33 from said clamping members 32.

The drive line shaft 35 is supported in concentric alinement in said torque tube by means of the packing ring 36 within the forward end of said torque tube, the tubular shaft of the drive shaft being strengthened to make as strong and light a driving shaft as possible. The rear end is supported by the differential pinion shaft bearing 37 in alinement with said packing ring 36 so that the rigid support of the torque tube 15 in the automobile frame also firmly supports the drive line 35 within the torque tube 15, thereby giving added rigidity and strength to the entire tube and chassis.

It is apparent that this simply constructed torque tube can be quickly and easily assembled in the automobile frame and when once assembled, is rigidly a part of said frame, holding the driving shaft in perfect alinement and giving added strength to said frame.

What is claimed as new is:

1. In an automobile frame having crosswise members, a torque tube extending from the transmission to the differential and rigidly supported in said members to thereby become a part of said frame.

2. In an automobile frame having crosswise members, a torque tube extending from the transmission to the differential and removably clamped in said crosswise members in said frame to thereby become a part of the same.

3. In an automobile frame structure, a frame member having transverse perforated members, a torque tube extending from the transmission to the differential and extending through the perforations, and means to removably connect the tube to said members.

4. In an automobile frame structure, a frame member having transverse perforated members, a torque tube extending through the perforations, said members each having a series of spaced movable parts surrounding the perforations thereof, and means to simultaneously clamp said movable parts about the tube and against the periphery thereof.

5. In an automobile frame structure, a frame member having transverse perforated members, a torque tube extending through the perforations, tube gripping means borne by each member to engage the periphery of the tube, and means to removably clamp the tube.

6. In an automobile frame construction, in combination with the transmission casing the differential casing, and the drive shaft, a tube enclosing the drive shaft and extending between said casing, means to attach the forward end of the tube to the transmission casing, means to attach the rear end of the tube to the differential casing, crosswise members between the casings rigidly secured to the frame through which the tube extends, and means to rigidly secure the tube to each of said members.

7. In an automobile frame having spaced crosswise members, a torque tube removably clamped in said crosswise members in said frame to become a part of the same, and attaching brackets on the forward end to the transmission casing and on the rear end to the differential casing to assist in the rigid support of said casing.

8. In an automobile frame having spaced crosswise members, said crosswise members having openings therethrough formed by toothed members shaped by spaced radial cuts and turned at right angles to said crosswise members, a torque tube fitting through said openings, and a clamping ring to rigidly hold said toothed members upon said torque tube to removably support the same in alinement in said frame.

9. In an automobile frame structure, a frame member having transverse parts, a torque tube supported intermediate its ends by each of said parts means to connect the tube to said parts means to support the rear end of the tube from the differential housing and a member connected to the transmission casing and to the front end of the tube for supporting said tube front end.

10. In an automobile frame structure a frame member having transverse parts a torque tube supported intermediate its ends by each of said parts means to connect the tube to said parts, means to support the rear end of the tube from the differential housing, and a member connected to the transmission casing and to the front end of the tube for supporting said tube front end, and including a pair of complementary parts between which the front end of the tube is received and clamped.

11. In an automobile frame having crosswise members, a torque tube rigidly supported in said members to thereby become a part of said frame, and attaching brackets on the forward end for attachment to the engine transmission casing and on the rear end to the differential casing to thereby rigidly connect the engine and torque tube and rear axle in the chassis, thus making a single rigid central frame unit or portion.

12. In an automobile frame structure, a frame member having transverse parts, a torque tube supported intermediate its ends by each of said parts, means to connect the tube to said parts, means to support the rear end of the tube from the differential housing, and a member connected to the transmission casing and to the front end of the tube for supporting said tube front end and including a bracket formed in two parts, means to attach each part to the transmission casing, said brackets having complementary parts which engage over the front end of the tube, and means to clamp the complementary parts together and about the tube.

13. In an automobile frame construction, a series of transverse members, a torque tube removably supported by said members, means to rigidly secure the tube to said members, a bracket carried by the rear end of the tube, means to connect said bracket to the differential housing, a bracket carried by the transmission housing, and means to removably attach the front end of the tube to said last named bracket.

14. In an automobile frame construction, in combination with the transmission casing the differential casing, and the drive shaft, a tube enclosing the drive shaft and extending between said casings, means to attach the forward end of the tube to the transmission casing, means to attach the rear end of the tube to the differential casing, and means between the casings rigidly secured to the frame and to the tube for supporting the latter.

15. In an automobile frame construction, a tube enclosing the drive shaft, means to support the tube at its front end adjacent to the transmission, means to support the rear end of the tube adjacent to the differential, and means to rigidly support the tube from the frame at a point between the transmission and differential.

16. In an automobile frame construction, a tube enclosing the drive shaft, means to attach the front end of the tube to the transmission casing, means to attach the rear end of the tube to the differential casing, and means to rigidly support the tube from the frame at a point between the transmission and differential.

In testimony whereof I have affixed signature in the presence of two witnesses.

CAIUS E. WEAVER.

Witnesses:
 THEO. THOMAS HAAG,
 CORINNE V. SWANSON.